(12) United States Patent
Hussain et al.

(10) Patent No.: US 8,884,867 B2
(45) Date of Patent: Nov. 11, 2014

(54) EFFICIENT BACKLIGHT SHORT CIRCUIT PROTECTION

(75) Inventors: Asif Hussain, San Jose, CA (US); Manisha P. Pandya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 13/311,474

(22) Filed: Dec. 5, 2011

(65) Prior Publication Data

US 2013/0141322 A1 Jun. 6, 2013

(51) Int. Cl.
*G01R 31/00* (2006.01)
*G09G 3/36* (2006.01)

(52) U.S. Cl.
USPC .......................................... 345/102; 324/414

(58) Field of Classification Search
CPC .............................. G02B 26/004; G02B 26/02
USPC .......... 315/224, 291, 307, 130; 345/690, 211, 345/102, 204, 212; 323/282; 324/522, 414
See application file for complete search history.

(56) References Cited

U.S. PATENT DOCUMENTS

| | | | | |
|---|---|---|---|---|
| 5,243,324 | A * | 9/1993 | Bober | 340/439 |
| 6,801,027 | B2 * | 10/2004 | Hann et al. | 323/282 |
| 7,262,752 | B2 | 8/2007 | Weindorf | |
| 7,525,318 | B2 | 4/2009 | Endo | |
| 7,659,672 | B2 * | 2/2010 | Yang | 315/224 |
| 8,773,349 | B2 | 7/2014 | Yoon et al. | |
| 2007/0159750 | A1 * | 7/2007 | Peker et al. | 361/93.1 |
| 2007/0210804 | A1 * | 9/2007 | Endoh | 324/522 |
| 2007/0236196 | A1 * | 10/2007 | Vo | 323/282 |
| 2007/0247450 | A1 * | 10/2007 | Lee | 345/204 |
| 2008/0094349 | A1 * | 4/2008 | Liao et al. | 345/102 |
| 2009/0251118 | A1 * | 10/2009 | Omi | 323/282 |
| 2010/0177127 | A1 * | 7/2010 | Akiyama et al. | 345/690 |
| 2010/0201194 | A1 * | 8/2010 | Masciarelli et al. | 307/66 |
| 2011/0025234 | A1 * | 2/2011 | Ohtaka et al. | 315/307 |
| 2011/0057969 | A1 | 3/2011 | Gao | |
| 2011/0115770 | A1 | 5/2011 | Seo et al. | |
| 2012/0098430 | A1 * | 4/2012 | Inoue et al. | 315/82 |
| 2012/0256897 | A1 * | 10/2012 | Seo et al. | 345/212 |
| 2012/0262070 | A1 * | 10/2012 | Oshima et al. | 315/130 |

FOREIGN PATENT DOCUMENTS

| | | |
|---|---|---|
| JP | 200724236 A | 9/2007 |
| KR | 10-2011-0133201 A | 12/2011 |
| KR | 10-2012-0082569 A | 7/2012 |
| WO | 0221885 A2 | 3/2002 |
| WO | 2008083392 A2 | 7/2008 |

OTHER PUBLICATIONS

International Search Report and Written Opinion for PCT No. PCT/US2012/057341 dated Jan. 24, 2013; 11 pages.
Korean WIPS Search Report for Korean Application No. 10-2014-7014747 dated Jun. 23, 2014; 10 pgs.

* cited by examiner

*Primary Examiner* — Sumati Lefkowitz
*Assistant Examiner* — Peijie Shen
(74) *Attorney, Agent, or Firm* — Fletcher Yoder PC

(57) ABSTRACT

Systems, methods, and devices are provided for detecting short circuits in a backlight assembly without a resistor-based current sensor. For example, an electronic display according to the present disclosure may include a display panel and a backlight assembly to illuminate the display panel. The backlight assembly may drive a backlight element to illuminate the display panel and may include backlight short-circuit detection circuitry. The backlight short-circuit protection circuitry may detect a feedback voltage associated with the backlight element and determine when a short circuit has occurred based at least in part on the feedback voltage.

24 Claims, 10 Drawing Sheets

EFFICIENT BACKLIGHT SHORT CIRCUIT PROTECTION

BACKGROUND

The present disclosure relates generally to a backlight assembly for an electronic display and, more particularly, to a backlight assembly having efficient backlight short circuit protection.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays, such as liquid crystal displays (LCDs), commonly appear in many different electronic devices. The brightness of an LCD depends on the amount of light provided by a backlight assembly. As the backlight assembly provides more light, the brightness of the LCD increases. Under certain circumstances, a short circuit may occur in the backlight assembly. When a short circuit occurs in the backlight assembly, other components of the electronic device could be damaged unless power to the backlight assembly is quickly cut off. As such, backlight assemblies typically include a resistor-based current sensor to detect when the amount of current drawn by the backlight assembly exceeds some threshold amount. Though a resistor-based current sensor may effectively indicate when a short circuit has occurred, the resistor-based current sensor continually wastes a portion of the power flowing to the backlight assembly as heat.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for detecting short circuits in a backlight assembly without a resistor-based current sensor. For example, an electronic display according to the present disclosure may include a display panel and a backlight assembly to illuminate the display panel. The backlight assembly may drive a backlight element to illuminate the display panel and may include backlight short-circuit detection circuitry. The backlight short-circuit protection circuitry may detect a feedback voltage associated with the backlight element and determine when a short circuit has occurred based at least in part on the feedback voltage.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
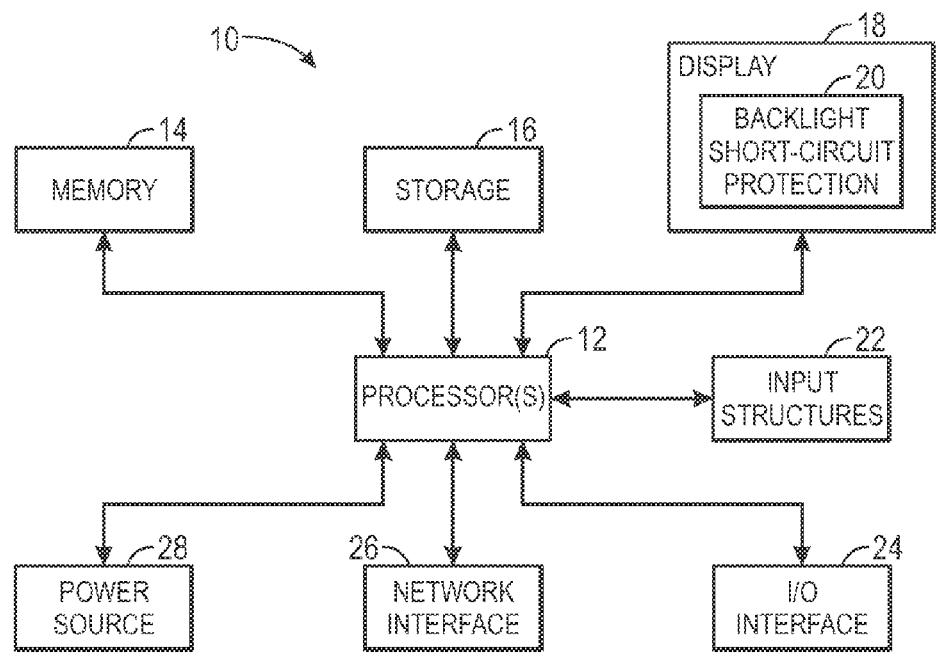
FIG. 1 is a schematic block diagram of an electronic device that incorporates a display with efficient backlight short-circuit protection, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements.

The terms "comprising," "including," and "having" are intended to be inclusive and mean that there may be additional elements other than the listed elements. Additionally, it should be understood that references to "one embodiment" or "an example," or the like, are not intended to be interpreted as excluding the existence of additional embodiments that also incorporate the recited features.

As mentioned above, a liquid crystal display (LCD) may be illuminated by a backlight assembly. If a short circuit occurs in the backlight assembly, the LCD and/or other components of an electronic device in which the LCD is installed could be damaged. To detect and protect against short circuits without constantly wasting power as heat, a backlight assembly according to the present disclosure may not use a resistor-based current sensor. Rather, the backlight assembly may detect a short circuit based on a sensed value of a feedback voltage, which may be compared to an input voltage of the backlight assembly or an expected voltage value of the feedback voltage.

According to the present disclosure, a backlight assembly may include backlight short-circuit protection circuitry that can detect short-circuit conditions at various phases of the backlight assembly operation. During an inrush phase of operation, for example, the backlight short-circuit protection circuitry may compare an input voltage VIN to a feedback voltage related to the voltage supplied to a backlight element (e.g., a string of light emitting diodes (LEDs)). When the difference between the input voltage VIN and the backlight element fall outside of a threshold (e.g., the backlight element voltage is less than 75% of the input voltage VIN), a short-circuit condition may be understood to be occurring. Under these conditions, the backlight short-circuit protection circuitry may cause the power supply to the backlight assembly to be cut. The backlight short-circuit protection circuitry may set a flag in the memory indicating that a short circuit has been detected.

Likewise, during a boost soft start phase or during a normal operation phase of the backlight assembly, the backlight short-circuit protection circuitry may at certain times test for a short-circuit condition. To do so, the backlight short-circuit protection circuitry may obtain a sensed value of the feedback voltage. In addition, the backlight short-circuit protection circuitry may receive an expected value of the feedback voltage from memory accessible to the backlight short-circuit protection circuitry. This expected value of the feedback voltage may represent a voltage value that would be expected to be present under non-short-circuit conditions. When the sensed value of the feedback voltage differs from the expected value of the feedback voltage by more than some threshold, a short-circuit condition may be understood to be occurring. As such, the backlight short-circuit protection circuitry may cause the power supply to the backlight assembly to be cut. The backlight short-circuit protection circuitry may set a flag in the memory indicating that a short circuit has been detected.

Figure 2:
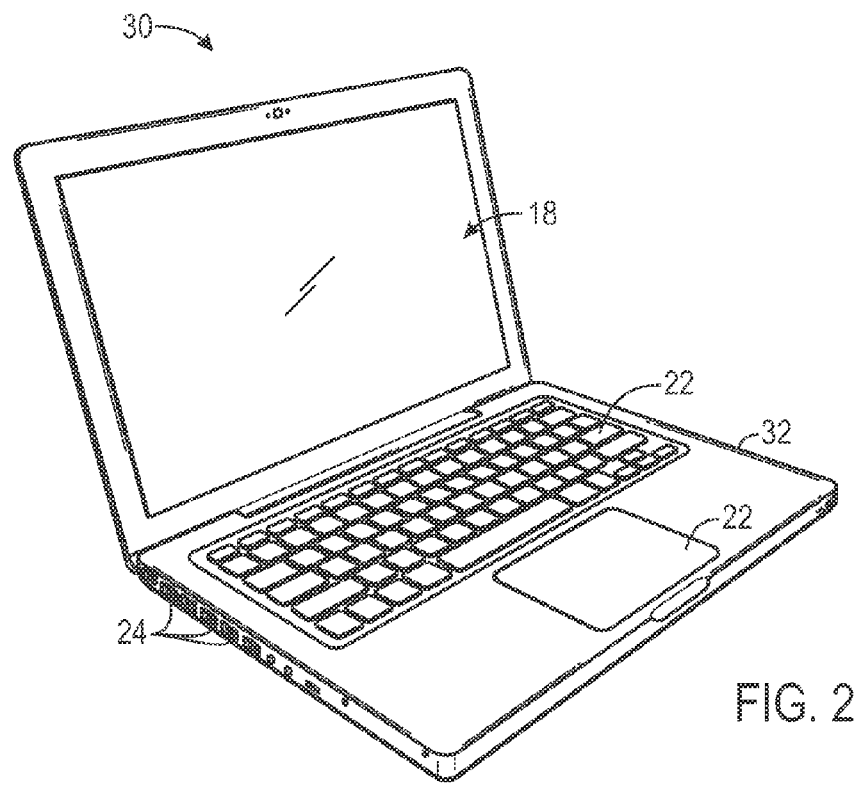
FIG. 2 is a perspective view of an example of the electronic device of FIG. 1 in the form of a notebook computer, in accordance with an embodiment.
Figure 3:
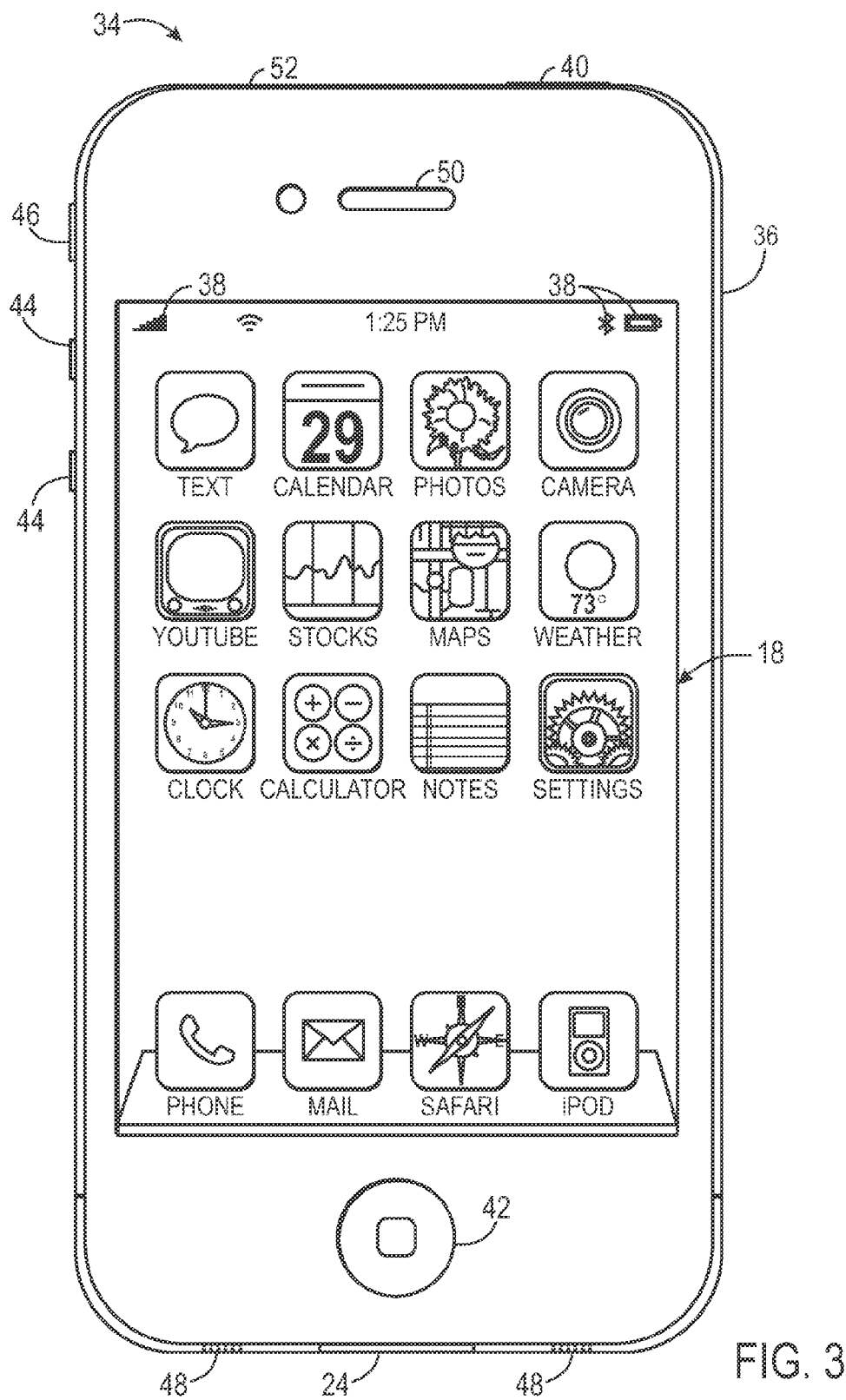
FIG. 3 is a front view of an example of the electronic device of FIG. 1 in the form of a handheld electronic device, in accordance with an embodiment.
Figure 4:
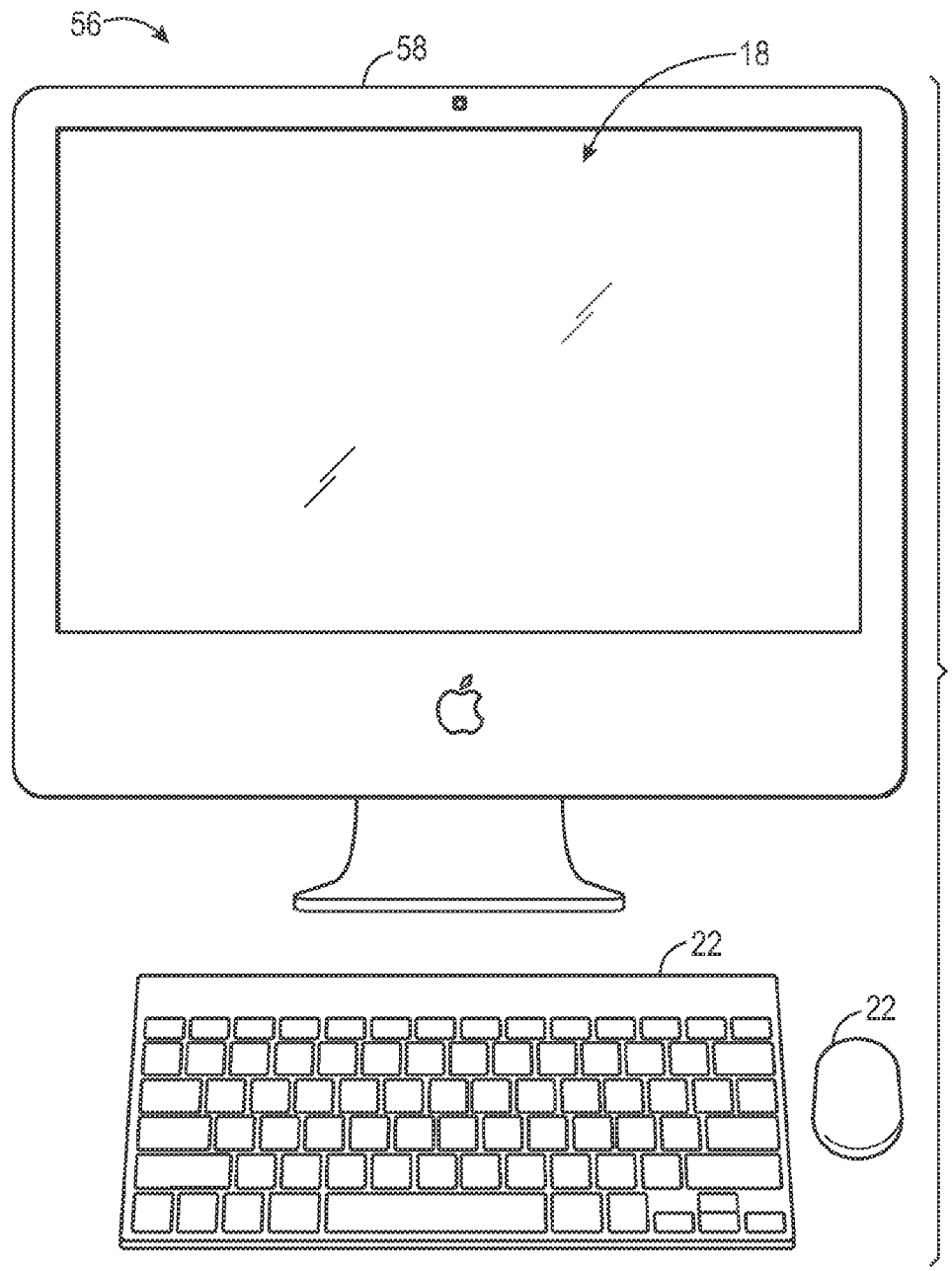
FIG. 4 is a front view of an example of the electronic device of FIG. 1 in the form of a desktop computer, in accordance with an embodiment.

With the foregoing in mind, a general description of suitable electronic devices that may employ electronic displays with backlight short-circuit protection capabilities will be provided below. In particular, FIG. 1 is a block diagram depicting various components that may be present in an electronic device suitable for use with such a display. FIGS. 2, 3, and 4 illustrate various examples of suitable electronic devices in the form of a notebook computer, a handheld electronic device, and a desktop computer, respectively.

Turning first to FIG. 1, an electronic device 10 according to an embodiment of the present disclosure may include, among other things, one or more processor(s) 12, memory 14, nonvolatile storage 16, a display 18 having backlight short-circuit protection circuitry 20, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

By way of example, the electronic device 10 may represent a block diagram of the notebook computer depicted in FIG. 2, the handheld device depicted in FIG. 3, the desktop computer depicted in FIG. 4, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to execute instructions to carry out various functions of the electronic device 10. Among other things, these functions may include generating image data to be displayed on the display 18. The programs or instructions executed by the processor(s) 12 may be stored in any suitable article of manufacture that includes one or more tangible, computer-readable media at least collectively storing the instructions or routines, such as the memory 14 and/or the nonvolatile storage 16. The memory 14 and the nonvolatile storage 16 may represent, for example, random-access memory, read-only memory, rewritable flash memory, hard drives, and optical discs. Also, programs (e.g., an operating system) encoded on such a computer program product may also include instructions that may be executed by the processor(s) 12 to enable other functions of the electronic device 10.

The display 18 may be a touch-screen liquid crystal display (LCD), for example, which may enable users to interact with a user interface of the electronic device 10. By way of example, the display 18 may be a MultiTouch™ display that can detect multiple touches at once. The display 18 may include backlight short-circuit protection circuitry 20 to efficiently detect short-circuit conditions that may arise in a backlight assembly of the display 18. Since a resistor-based current sensor could inefficiently dissipate substantial amounts of power over time, the backlight short-circuit protection circuitry 20 may detect short-circuit conditions in other ways. Namely, the backlight short-circuit protection circuitry 20 may, at certain times, detect voltage(s) relating to a backlight element of the display 18. Based on these detected voltage value(s), the backlight short-circuit protection circuitry 20 may determine whether a short circuit has occurred without using feedback from a resistor-based current sensor.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. The input structures 22, such as a keyboard and/or touchpad, may be used to interact with the computer 30. Via the input structures 22, a user may start, control, or operate a GUI or applications running on computer 30.

The display 18 of the computer 30 may be a backlit liquid crystal display (LCD). When the display 18 includes the backlight short-circuit protection circuitry 20, the computer 30 may be largely protected from backlight short-circuit conditions that could damage other components of the computer 30 if not detected. As mentioned above, the display 18 may detect short-circuit conditions without relying on a resistor-based current sensor. Rather, the backlight short-circuit protection circuitry 20 of the display 18 may detect short circuits by occasionally sensing voltage(s) in the backlight assembly of the display 18. Based at least partly on the sensed voltage(s), the backlight short-circuit protection circuitry 20 of the display 18 may determine if a short circuit has occurred.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate user interface 20 to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones.

Like the display 18 of the computer 30, the display 18 of the handheld device 34 may be a backlit liquid crystal display (LCD). Backlight short-circuit protection circuitry 20 associated with the display 18 may protect other components of the handheld device 34 from damage that could occur from backlight short-circuit conditions. As mentioned above, the display 18 may detect short-circuit conditions without relying on a resistor-based current sensor. Rather, the backlight short-circuit protection circuitry 20 of the display 18 may detect short circuits by occasionally sensing voltage(s) in the backlight assembly of the display 18. Based at least partly on the sensed voltage(s), the backlight short-circuit protection circuitry 20 of the display 18 may determine if a short circuit has occurred.

The electronic device 10 also may take the form of a desktop computer 56, as generally illustrated in FIG. 4. In certain embodiments, the electronic device 10 in the form of the desktop computer 56 may be a model of an iMac®, Mac® mini, or Mac Pro® available from Apple Inc. The desktop computer 56 may include a housing 58, a display 18, and input structures 22, among other things. The input structures 22, such as a wireless keyboard and/or mouse, may be used to interact with the desktop computer 56. Via the input structures 22, a user may start, control, or operate a GUI or applications running on the desktop computer 56.

The display 18 may be a backlit liquid crystal display (LCD). When the display 18 includes the backlight short-circuit protection circuitry 20, the desktop computer 56 may be largely protected from backlight short-circuit conditions that could damage other components of the desktop computer 56 if not detected. As mentioned above, the display 18 may detect short-circuit conditions without relying on a resistor-based current sensor. Rather, the backlight short-circuit protection circuitry 20 of the display 18 may detect short circuits by occasionally sensing voltage(s) in the backlight assembly of the display 18. Based at least partly on the sensed voltage(s), the backlight short-circuit protection circuitry 20 of the display 18 may determine if a short circuit has occurred.

Regardless of whether the electronic device 10 takes the form of the computer 30 of FIG. 2, the handheld device 34 of FIG. 3, the desktop computer 56 of FIG. 4, or some other form, the display 18 of the electronic device 10 may form an array or matrix of picture elements (pixels). By varying an electric field associated with each pixel, the display 18 may control the orientation of liquid crystal disposed at each pixel. The orientation of the liquid crystal of each pixel may permit more or less light emitted from a backlight to pass through each pixel. The display 18 may employ any suitable technique to manipulate these electrical fields and/or the liquid crystals. For example, the display 18 may employ transverse electric field modes in which the liquid crystals are oriented by applying an in-plane electrical field to a layer of the liquid crystals. Examples of such techniques include in-plane switching (IPS) and/or fringe field switching (FFS) techniques.

By controlling of the orientation of the liquid crystals, the amount of light emitted by the pixels may change. Changing the amount of light emitted by the pixels will change the colors perceived by a user of the display 18. Specifically, a group of pixels may include a red pixel, a green pixel, and a blue pixel, each having a color filter of that color. By varying the orientation of the liquid crystals of different colored pixels, a variety of different colors may be perceived by a user viewing the display. It may be noted that the individual colored pixels of a group of pixels may also be referred to as unit pixels.

Figure 5:
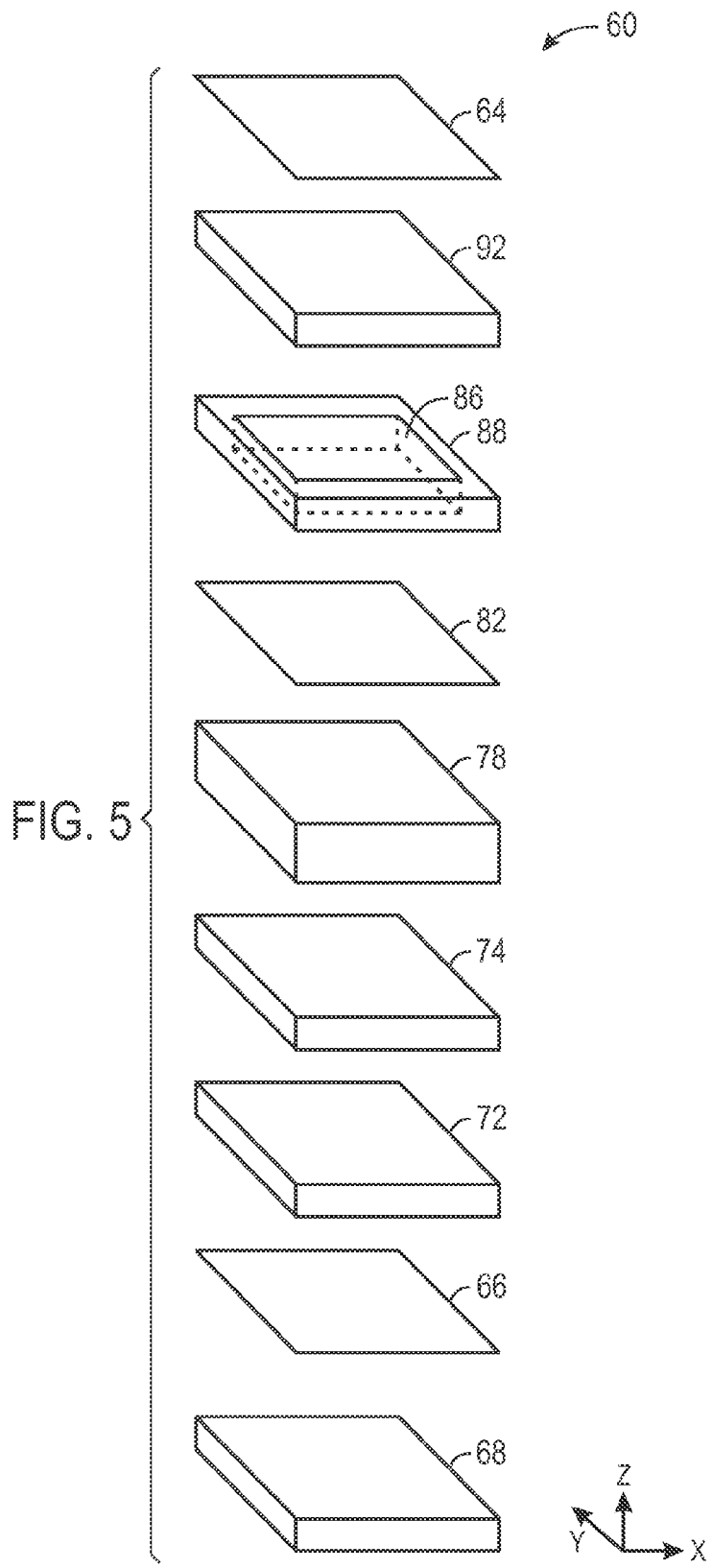
FIG. 5 is a schematic exploded view of various layers of the electronic display of the electronic device of FIG. 1, in accordance with an embodiment.

With the foregoing in mind, FIG. 5 depicts an exploded view of different layers of a pixel of the display 18. The pixel 60 includes an upper polarizing layer 64 and a lower polarizing layer 66 that polarize light emitted by a backlight assembly 68. Although not visible in FIG. 5, the backlight assembly 68 includes the backlight short-circuit protection circuitry 20 discussed throughout this disclosure. A lower substrate 72 is disposed above the polarizing layer 66 and is generally formed from a light-transparent material, such as glass, quartz, and/or plastic.

A thin film transistor (TFT) layer 74 appears above the lower substrate 72. For simplicity, the TFT layer 74 is depicted as a generalized structure in FIG. 5. In practice, the TFT layer may itself include various conductive, non-conductive, and semiconductive layers and structures that generally form the electrical devices and pathways that drive the operation of the pixel 60. The TFT layer 74 may also include an alignment layer (formed from polyimide or other suitable materials) at the interface with a liquid crystal layer 78.

The liquid crystal layer 78 includes liquid crystal particles or molecules suspended in a fluid or gel matrix. The liquid crystal particles may be oriented or aligned with respect to an electrical field generated by the TFT layer 74. The orientation of the liquid crystal particles in the liquid crystal layer 78 determines the amount of light transmission through the pixel 60. Thus, by modulation of the electrical field applied to the liquid crystal layer 78, the amount of light transmitted though the pixel 60 may be correspondingly modulated.

Disposed on the other side of the liquid crystal layer 78 from the TFT layer 74 may be one or more alignment and/or overcoating layers 82 interfacing between the liquid crystal layer 78 and an overlying color filter 86. The color filter 86 may be a red, green, or blue filter, for example. Thus, each pixel 60 corresponds to a primary color when light is transmitted from the backlight assembly 68 through the liquid crystal layer 78 and the color filter 86.

The color filter 86 may be surrounded by a light-opaque mask or matrix, represented here as a black mask 88. The black mask 88 circumscribes the light-transmissive portion of the pixel 60, delineating the pixel edges. The black mask 88 may be sized and shaped to define a light-transmissive aperture over the liquid crystal layer 78 and around the color filter 86. In addition, the black mask 88 may cover or mask portions of the pixel 60 that do not transmit light, such as the scanning line and data line driving circuitry, the TFT, and the periphery of the pixel 60. In the example of FIG. 5, an upper substrate 92 may be disposed between the black mask 88 and color filter 86 and the polarizing layer 64. The upper substrate 92 may be formed from light-transmissive glass, quartz, and/or plastic.

Figure 6:
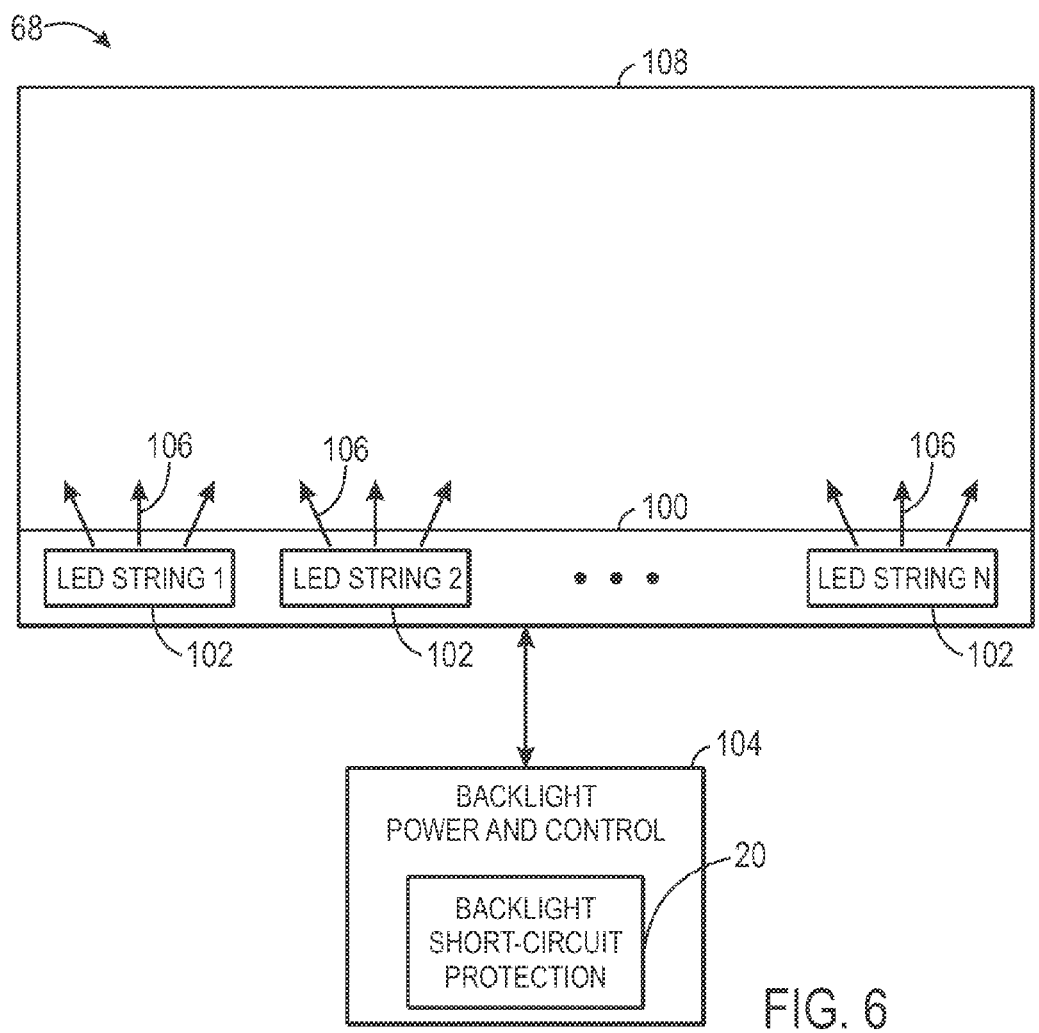
FIG. 6 is a schematic block diagram of a backlight assembly having backlight power and control circuitry with efficient backlight short-circuit protection, in accordance with an embodiment.

The backlight assembly 68 provides light to illuminate the display 18. As seen in FIG. 6, the backlight assembly 68 may include, among other things, one or more backlight elements 100 such as light emitting diode (LED) strings 102. Although the backlight elements 100 in FIG. 6 are shown to be LED strings 102, additionally or alternatively, any other suitable light-emitting backlight elements 100 may be employed. For example, one or more cold cathode lighting elements may be used in lieu of, or in addition to, the LED strings 102. Moreover, although the LED strings 102 of the backlight assembly 68 schematically appear to be disposed in discrete locations apart from one another, the LED strings 102 may be interleaved among one another.

Backlight driver circuitry, here illustrated as backlight power and control circuitry 104, may drive the LED strings 102 to emit light 106. In the example of FIG. 6, the backlight assembly 68 is shown to be edge-lit. That is, the backlight elements 100 may be located at the edge of a diffuser 108, rather than directly underneath. The light 106 may enter the light diffuser 108, which may cause the light 106 to be diffused substantially evenly. Additionally, the light diffuser 108 may cause the light to pass up through the other layers of the display 18, which have been generally discussed above with reference to FIG. 5. While the backlight assembly 68 of FIG. 6 is represented as an edge-lit backlight assembly 68, other arrangements are possible. Indeed, the backlight elements 100 may be disposed in any suitable arrangement, including being disposed beneath or behind the backlight diffuser 108.

The backlight power and control circuitry 104 may control the brightness of the display 18 by varying the amount of light 106 emitted by the LED strings 102. For example, the backlight power and control circuitry 104 may employ any suitable form of pulse width modulation (PWM) to drive the LED strings 102. By varying the duty cycle over which the LED strings 102 are driven over PWM clock cycles, the light perceived by a user of the display may be increased or decreased.

On rare occasion, the power used to drive the LED strings 102 could result in a short circuit. Such a short circuit could damage other components of the electronic device 10. As such, the backlight power and control circuitry 104 may include the backlight short-circuit protection 20. When a short circuit occurs in the backlight assembly 68, the backlight short-circuit protection circuitry 20 may detect the short circuit and shut off power to the backlight elements 100. Although doing so will render the electronic device 10 in which the display 18 is installed effectively unusable, other components of the electronic device 10 will be protected, and it may be possible to repair the electronic device 10 in the future.

Figure 7:
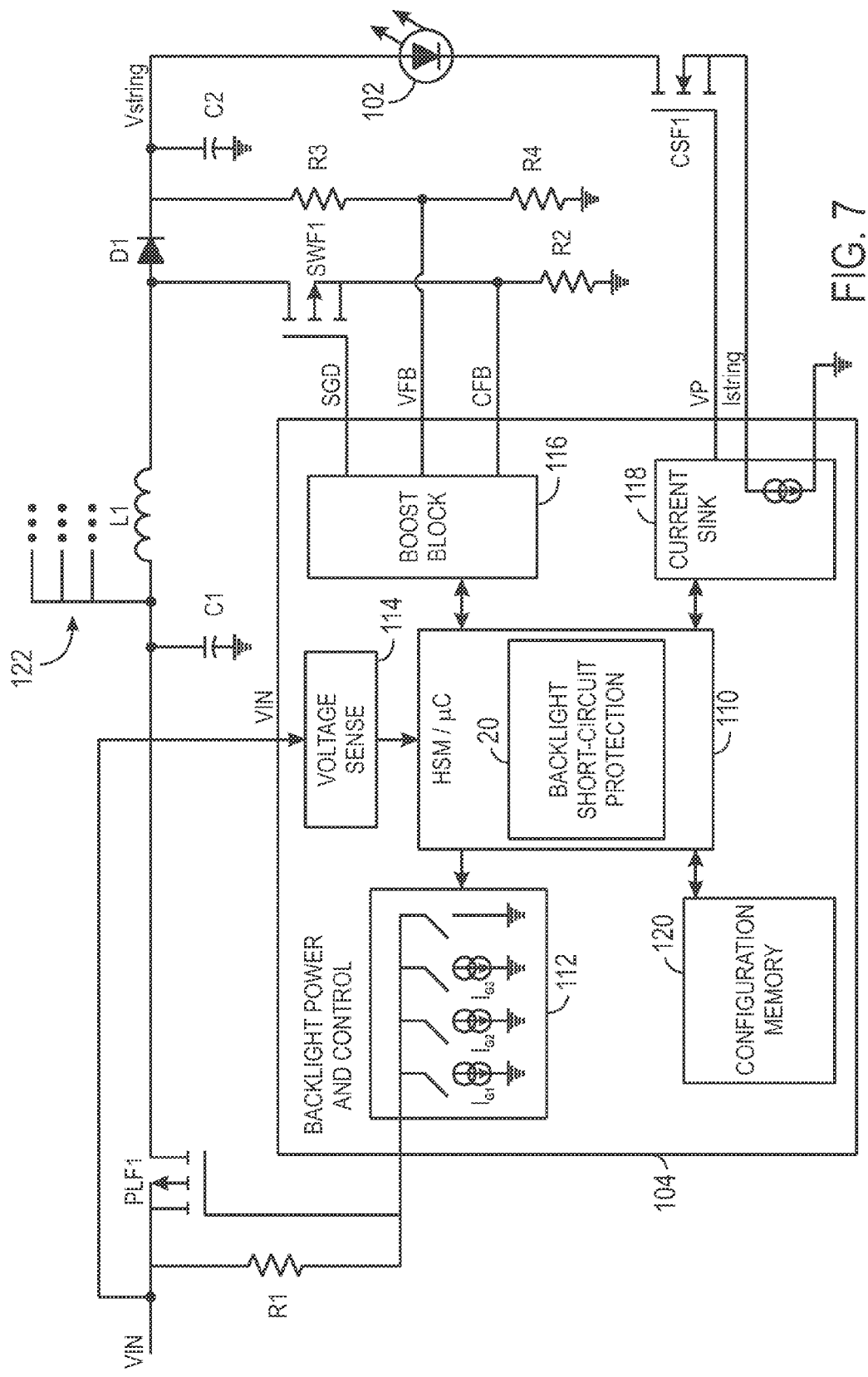
FIG. 7 is a circuit diagram representing a portion of the backlight assembly of FIG. 6, in accordance with an embodiment.

A circuit diagram of FIG. 7 illustrates a relationship between the backlight power and control circuitry 104 and circuitry used to control the backlight elements 100 (e.g., the LED strings 102). A hardware state machine (HSM) and/or microcontroller (μC) 110 may generally govern the operation of the backlight power and control circuitry 104. The HSM and/or μC 110 may also include the backlight short-circuit protection circuitry 20, the general operation of which will be discussed further below. To enable the HSM and/or μC 110 to control the manner in which the backlight elements 100 are driven with power, the backlight power and control circuitry 104 may include current sinks 112, voltage sense circuitry 114, a boost block 116, current sink 118, and configuration memory 120.

These components may enable the backlight power and control circuitry 104 to control three distinct phases of backlight assembly 68 operation: an inrush phase, in which input power initially enters the power supply circuitry of the backlight assembly 68 at an input voltage VIN; a boost soft start phase, in which the boost block 116 boosts the voltage to a level sufficient to drive the backlight elements 100 (e.g., the LED string 102); and a normal operation phase, in which the current sink 118 drives the backlight elements 100 (e.g., the LED strings 102) by drawing current through them according to some pattern (e.g., a pulse width modulation (PWM) duty cycle). Since short circuits could potentially occur during any of these phases of operation, the backlight short-circuit protection circuitry 20 may take different measures to detect short-circuit conditions. In each case, the backlight short-circuit protection circuitry 20 may not rely on a resistor-based current sensor, which is not present in the example of the backlight assembly 68 of FIG. 7. Instead, the backlight short-circuit protection circuitry 20 may use sensed voltage value(s) and/or expected voltage values stored in the configuration memory 120 to determine whether a short circuit has occurred.

The inrush phase may begin when the HSM and/or μC 110 cause the current sinks 112 to activate a power line field effect transistor (FET) PLF1. The current sinks 112 may be used by the HSM and/or μC 110 to control the slew rate of the power line FET PLF1 and, by extension, to control the length of time of the inrush phase. Specifically, by applying a gate current $I_{G1}$, $I_{G2}$, and/or $I_{G3}$ from the current sinks 112 to the gate of the power line FET PLF1, the HSM and/or μC 110 may control the slew rate of the power line FET PLF1. It should be understood that the resistor R1 shown in FIG. 7 may optionally be present, but may not be present in other embodiments. When the power line FET PLF1 is activated, an input voltage VIN from an external power supply may be supplied to the backlight assembly 68. As a result, an inrush current may enter the circuitry beyond power line FET PLF1 into a capacitance C1 and through an inductance L1 toward a LED string 102. The amount of time required to complete this inrush phase, also referred to herein as the inrush period Tinrush, may depend upon the slew rate of the power line FET PLF1. In general, the HSM and/or μC 110 may select which of the current sinks 112 to apply based on a programmed value of Tinrush stored in the configuration memory 120. For example, a value set in the configuration memory 120 may set the inrush period Tinrush to one of a variety of suitable values (e.g., 5 ms, 50 ms, 100 ms, or 500 ms, or the like). Depending on the programmed value of Tinrush, the HSM and/or μC 110 may select different of the current sinks 112, varying the slew rate of the power line FET PLF1 and, accordingly, the inrush current. The HSM and/or μC 110 may also deactivate the power line FET PLF1 by grounding the gate of the power line FET PLF1, a condition selectable from among the current sinks 112.

During the inrush phase, power may flow to the inputs of all the LED strings 102 of the backlight assembly 68. It should be noted, however, that FIG. 7 illustrates circuitry to drive only one of the LED strings 102. For clarity, like circuitry may be used to drive the other LED strings 102, the start of which is generally represented at numeral 122. In particular, the circuitry associated with the boost block 116 and the current sink 118 shown in FIG. 7 may operate exclusively with a single one of the LED strings 102. That is, the inductance L1, a diode D1, a switching FET SWF1, resistors R2, R3, and R4, a current sink FET CSF1, and certain functionalities of the boost block 116 and current sink 118 shown in FIG. 7 may be associated exclusively with driving a single one of the LED strings 102. For clarity, only one LED string 102 and its associated driving circuitry are shown in FIG. 7. It should be understood, however, that an actual implementation may employ additional like circuitry from numeral 122 to drive each of the other LED strings 102 of the backlight assembly 68.

The backlight short-circuit protection circuitry 20 may use sensed feedback voltage values during the inrush phase to protect the backlight assembly 68, the display 18 in which the backlight assembly 68 is installed, and/or the electronic device 10 in which the display 18 is installed from short-circuit conditions arising in the backlight assembly 68. Specifically, the backlight short-circuit protection circuitry 20 may receive a value of the input voltage VIN from the voltage sense block 114 and a feedback voltage VFB value from the boost block 116. It should be understood that the feedback voltage VFB may directly relate to the LED string 102 input voltage Vstring through a voltage divider circuit formed by the resistors R3 and R4. For example, when the resistors R3 and R4 are of the same value, the feedback voltage VFB will be approximately half the value of the LED string 102 input voltage Vstring. As will be discussed below with reference to FIG. 8, a comparison between the feedback voltage VFB and the LED string 102 input voltage Vstring may indicate whether the a short-circuit condition has occurred. When the backlight short-circuit protection circuitry 20 detects a short circuit, the HSM and/or μC 110 may cut off power to the backlight assembly 68 by deactivating the power line FET PLF1. In some embodiments, if the configuration memory 120 indicates that a hiccup timer has been enabled, the backlight short-circuit protection circuitry 20 may allow the backlight assembly 68 to restart operation and retest for short circuits after a period of time.

The boost soft start phase may begin after the inrush phase. During the boost soft start phase, the boost block 116 may boost the voltage from the input voltage VIN to a voltage high enough to drive the LED string 102. Specifically, the boost block 116 may vary a switching signal SGD supplied to the switching FET SWF1. The current may flow through the inductance L1, the switching FET SWF1, and the resistor R2 at a higher rate than otherwise. Because of the inductance L1, this higher rate of current will continue to flow even when the switching FET SWF1 is switched off, flowing through the diode D1 and the resistors R3 and R4 at this higher rate and increasing the LED string 102 input voltage Vstring accordingly. The boost block 116 may determine the duty cycle of the switching signal SGD by sensing the feedback voltage VFB that occurs between the resistors R3 and R4 and the current sink block 118. Since the feedback voltage VFB correlates with the LED string 102 input voltage Vstring, and the switching signal SGD duty cycle impacts the degree to which the voltage is boosted, the boost block 116 may vary the switching signal SGD frequency based on the feedback voltage VFB to achieve a desired LED string 102 input voltage Vstring.

The backlight short-circuit protection circuitry 20 may also use the feedback voltage VFB sensed by the boost block 116 to ascertain whether a short circuit has occurred during the boost soft start phase. Specifically, as will be discussed below with reference to FIGS. 9 and 10, the backlight short-circuit protection circuitry 20 may compare the feedback voltage VFB (or an estimate of the LED string 102 input voltage Vstring determined from the feedback voltage VFB) to an expected voltage value stored in the configuration memory 120 to determine whether a short circuit has occurred. When the backlight short-circuit protection circuitry 20 detects a short circuit, the HSM and/or μC 110 may cut off power to the backlight assembly 68 by deactivating the power line FET PLF1. In some embodiments, if the configuration memory 120 indicates that a hiccup timer has been enabled, the backlight short-circuit protection circuitry 20 may allow the backlight assembly 68 to restart operation and retest for short circuits after a period of time.

Following the boost soft start phase, the LED string 102 input voltage Vstring may be sufficiently high to drive the LED string 102 during a normal operation phase. As such, the backlight assembly 68 may enter a phase of normal operation, during which the LED string 102 may be driven according to varying patterns (e.g., pulse width modulation (PWM) duty cycles) to achieve corresponding brightness levels. To cause the LED string 102 to emit light, the current sink 118 may activate a current sink FET CSF1 using a power voltage VP signal and draw a string current Istring through to ground. While the current sink 118 has activated the current sink FET CSF1 and is drawing the string current Istring through the LED string 102, the LED string 102 will emit light, illuminating the electronic display 18. By varying the ratio of time the LED string 102 is on and emitting light to the time the LED string 102 is off and is not emitting light (i.e., the duty cycle of the LED string 102), the current sink 118 may set the perceived brightness of the display 18 to various dimming levels.

During the normal operation phase, the backlight short-circuit protection circuitry 20 may occasionally (e.g., periodically or when desired) test for short circuits using the feedback voltage VFB sensed by the boost block 116. Specifically, as will be discussed below with reference to FIG. 11, the backlight short-circuit protection circuitry 20 may compare the feedback voltage VFB (or an estimate of the LED string 102 input voltage Vstring determined from the feedback voltage VFB) to an expected voltage value stored in the configuration memory 120 to determine whether a short circuit has occurred. When the backlight short-circuit protection circuitry 20 detects a short circuit, the HSM and/or μC 110 may cut off power to the backlight assembly 68 by deactivating the power line FET PLF1. In some embodiments, if the configuration memory 120 indicates that a hiccup timer has been enabled, the backlight short-circuit protection circuitry 20 may allow the backlight assembly 68 to restart operation and retest for short circuits after a period of time.

As mentioned above, the operation of the backlight power and control circuitry 104 may be influenced by values stored in the configuration memory 120, which may represent any suitable memory to store operational parameters of the backlight power and control circuitry. For example, the configuration memory 120 may represent electrically erasable programmable read only memory (EEPROM), flash memory, read only memory (ROM), random access memory (RAM) programmed by a component of the electronic device 10, or any other suitable form of memory. By way of example, operational parameters of the backlight assembly 68 that may be stored in the configuration memory 120 may include a selectable inrush period Tinrush (e.g., 5 ms, 50 ms, 100 ms, and/or 500 ms, or the like), a hiccup timer enable flag, and/or a selectable hiccup timer setting (e.g., 100 ms or 1000 ms, or the like). As will be described further below, the hiccup timer may be used to ensure that a false positive detection of a short circuit does not cause the backlight assembly 68 to be permanently disabled by the backlight short-circuit protection circuitry 20.

Figure 8:
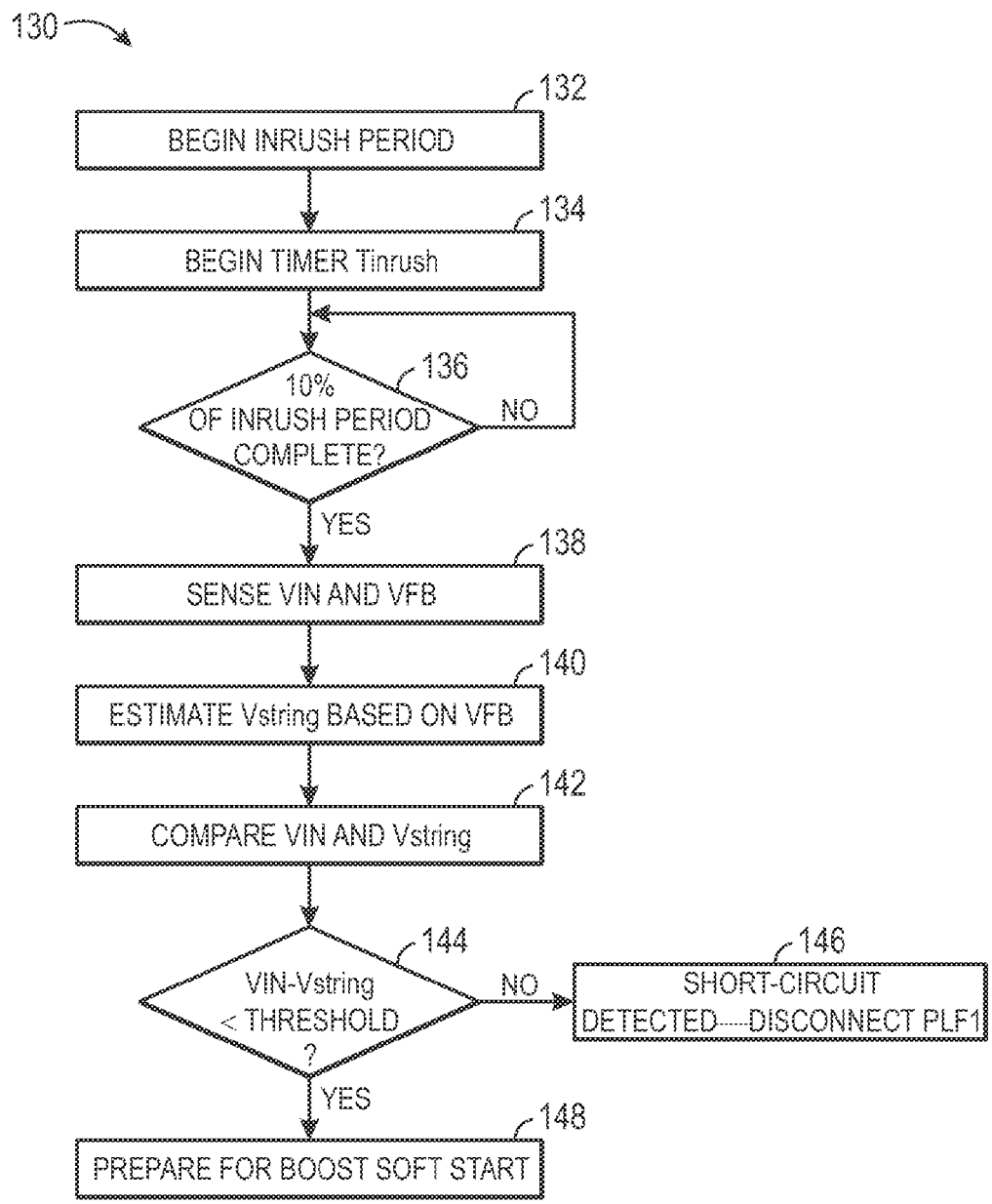
FIG. 8 is a flowchart describing a method for detecting a short-circuit condition in the backlight assembly during an inrush phase of operation of the backlight assembly, in accordance with an embodiment.
Figure 9:
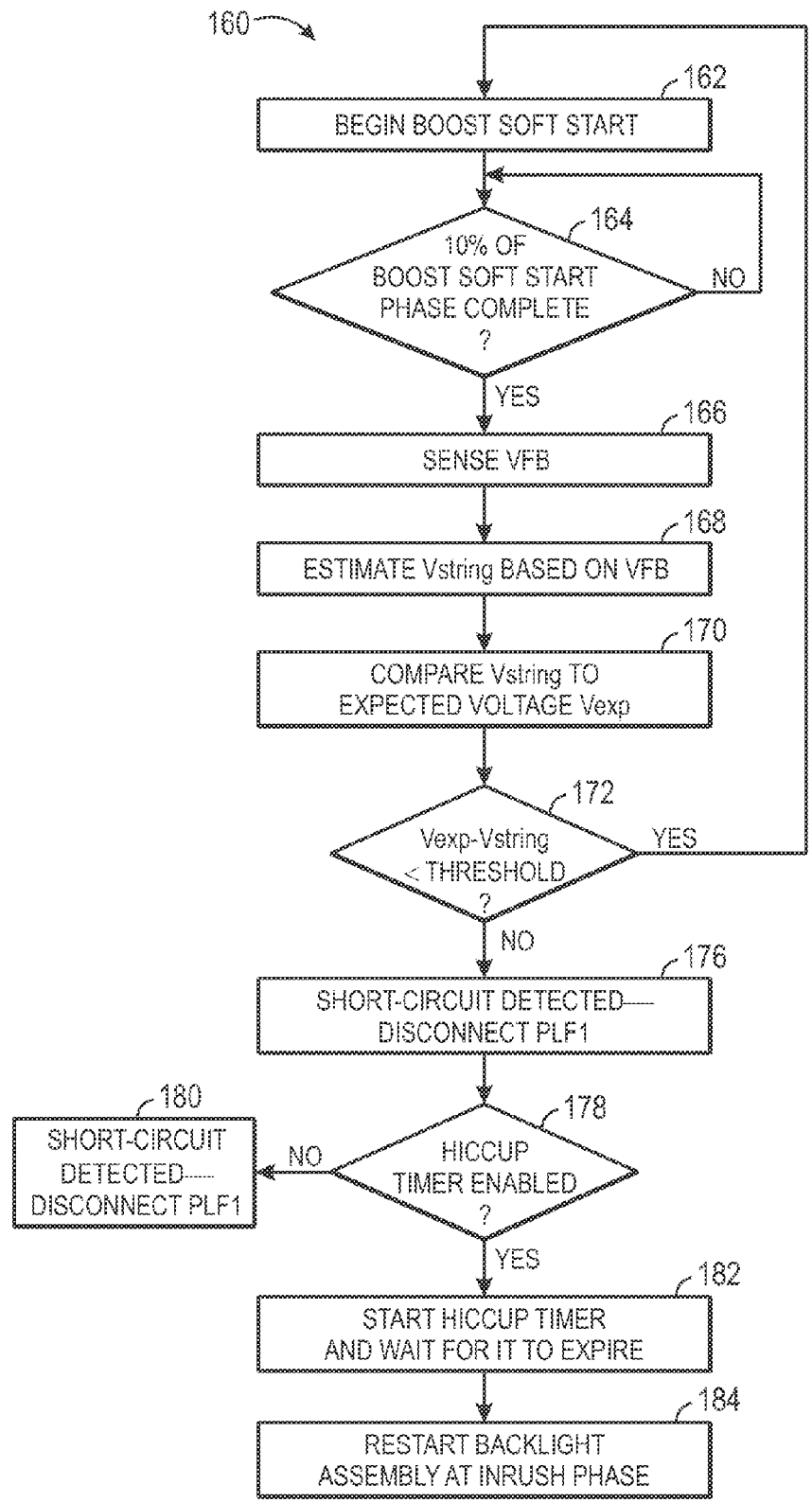
FIG. 9 is a flowchart describing a method for detecting a short-circuit condition in the backlight assembly during a boost soft start phase of operation of the backlight assembly, in accordance with an embodiment.
Figure 10:
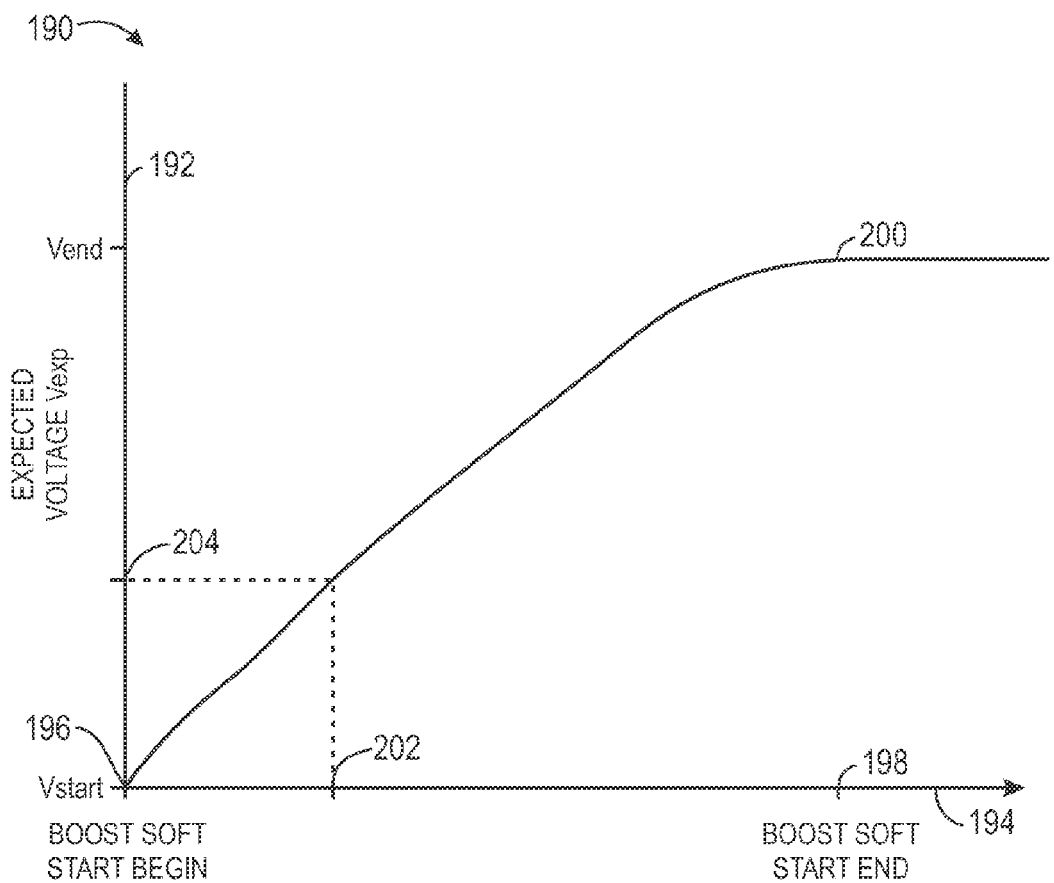
FIG. 10 is a plot modeling expected values of voltage supplied to a backlight element over the boost soft start phase, in accordance with an embodiment.
Figure 11:
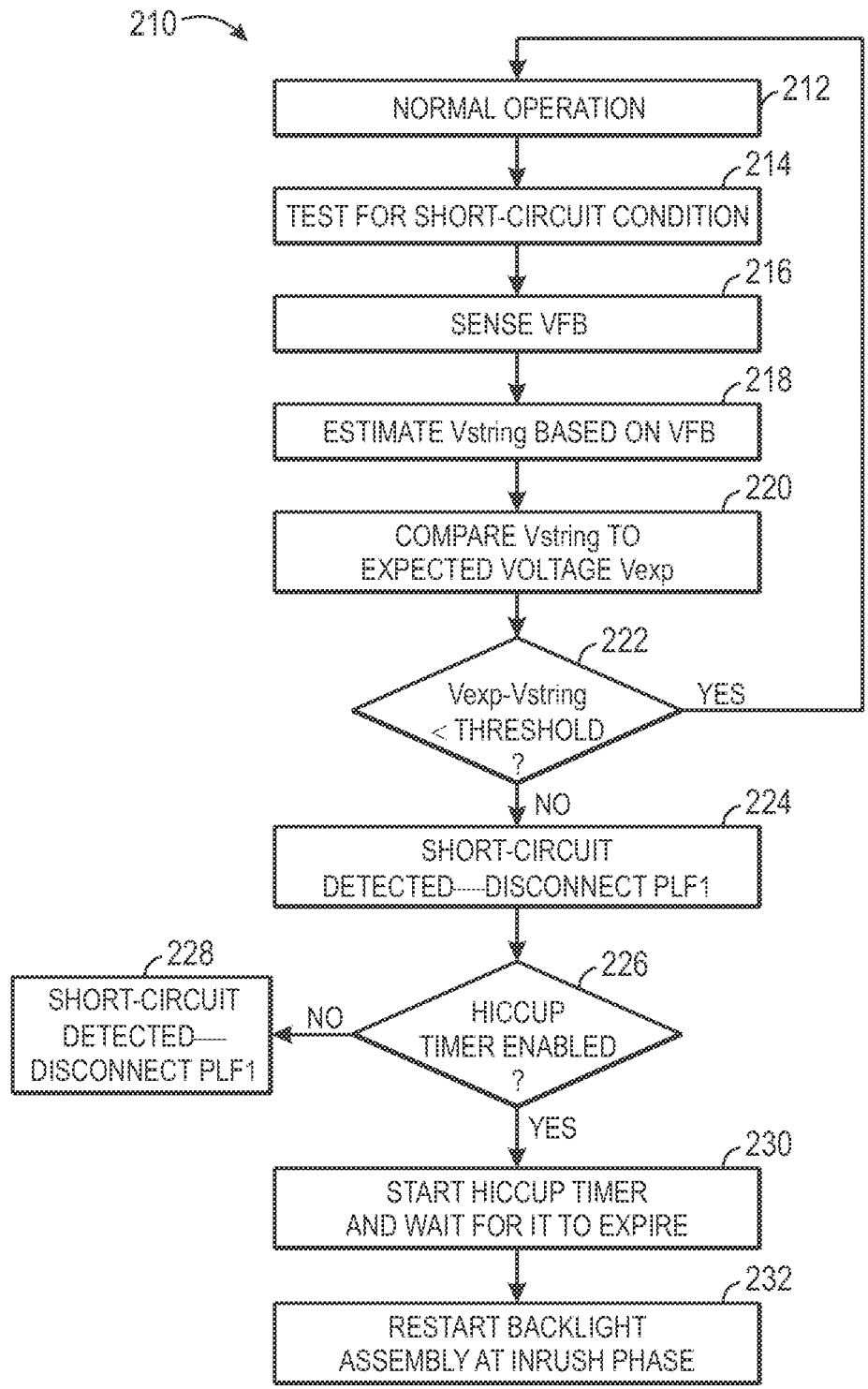
FIG. 11 is a flowchart describing a method for detecting a short-circuit condition in the backlight assembly during a normal operation phase of the backlight assembly, in accordance with an embodiment.

The backlight short-circuit protection circuitry 20 of the HSM and/or μC 110 may detect and protect against short-circuit conditions in somewhat different ways during the various phases of operation described above. As will be discussed below, FIG. 8 represents a manner of detecting short circuits during the inrush phase, FIGS. 9 and 10 represent a manner of detecting short circuits during the boost soft start phase, and FIG. 11 represents a manner of detecting short circuits during the phase of normal operation. It should be understood that the methods of the flowcharts of FIGS. 8, 9, and 11 may be carried out by the backlight short-circuit protection circuitry 20 as hard-coded in hardware as a hardware state machine (HSM) or as instructions running on a microcontroller (μC).

Turning to FIG. 8, a flowchart 130 represents a manner of detecting short-circuit conditions in the backlight assembly 68. The flowchart 130 may begin as the inrush phase of operation of the backlight assembly 68 begins (block 132). This inrush phase may start when the HSM and/or μC 100 causes the power line FET PLF1 to be activated, causing current to rush into some of the backlight assembly 68 circuitry. The backlight short-circuit protection circuitry 20 may begin a timer measuring the time elapsed since the start of the inrush period (block 134). After some amount of time has passed, represented here as 10% of the inrush period Tinrush, has completed (decision block 136), the backlight power and control circuitry 104 may sense the input voltage VIN and the feedback voltage VFB (block 138). Although the decision block 136 illustrates the value of 10% of the inrush period Tinrush, any other suitable value may be contemplated. In general, since a short circuit is likely to become apparent relatively early in the inrush phase, it may be useful to sense the voltages VIN and VFB earlier in the inrush phase rather than later. The value 10% has been provided as one example that ensures the FETs of the backlight assembly 68 operate within a safe operating area (SOA). It should be appreciated that this value may vary in an actual implementation, but generally may be selected such that the FETs of the backlight assembly 68 operate within an SOA.

The feedback voltage VFB correlates directly with the LED string 102 input voltage Vstring. Thus, the backlight short-circuit protection circuitry 20 may estimate the LED string 102 input voltage Vstring from the feedback voltage VFB (block 140). For example, when the resistors R2 and R3 are equivalent, Vstring will be approximately equal to double the feedback voltage VFB. Alternatively, the backlight short-circuit protection circuitry 20 may not estimate the LED string 102 input voltage Vstring. Thus, the backlight short-circuit protection circuitry 20 may compare the input voltage VIN and the LED string 102 input voltage Vstring (block 142) or, alternatively, the input voltage VIN and the feedback voltage VFB, to determine whether a short-circuit condition is present.

Under non-short-circuit conditions, the input voltage VIN and the string voltage Vstring should be approximately equal, less any efficiency losses due to circuit elements between the input voltage VIN and Vstring (e.g., a voltage reduction due to the diode D1). When a short circuit is occurring, however, the input voltage VIN may be significantly higher than the LED string 102 input voltage Vstring. Thus, when a difference between the input voltage VIN and the LED string 102 input voltage Vstring is within some threshold value (decision block 144), it may be understood that a short circuit is not occurring. That is, depending on the efficiency losses of the circuitry from VIN to Vstring, when Vstring is within some threshold value (e.g., is approximately 75%) of VIN, a short circuit may be understood not to be occurring. The threshold value may be a programmable value stored in the configuration memory 120 or may be, for example, hard-coded in the backlight short-circuit protection circuitry 20.

When the difference between the input voltage VIN and the LED string 102 input voltage Vstring is within the threshold value (decision block 144), the backlight short-circuit protection circuitry 20 may determine that a short circuit is not occurring. Accordingly, the backlight power and control circuitry 104 may continue as normal in the inrush phase in preparation for the boost soft start phase (block 146). When the difference between the input voltage and the string voltage is not within the threshold value (decision block 144), it may be understood that a short-circuit condition has been detected, and thus the backlight power and control circuitry 104 may be directed by the backlight short-circuit protection circuitry 20 to disconnect the power line FET PLF1 (block 148). Doing so could render the display 18 unusable, given that the backlight assembly 68 will no longer illuminate the display 18. Disconnecting the power line FET PLF1 will, however, protect other components of the electronic device 10, making it possible to refurbish the electronic device 10 in the future. In addition to disconnecting the power line FET PLF1, the backlight short-circuit protection circuitry 20 may also cause the configuration memory 120 to store an indication that a short-circuit condition was detected during the inrush phase of the operation of the backlight assembly 68.

Although the flowchart 130 of FIG. 8 illustrated a manner of detecting short circuits by comparing the input voltage VIN and the LED string 102 input voltage Vstring, alternative manners of detecting short circuits during the inrush phase may be employed. For example, the backlight short-circuit protection circuitry 20 may test the LED string 102 input voltage Vstring or the feedback voltage VFB against an expected voltage value Vexp. The value of Vexp may be stored in the configuration memory 120 and may represent the value of the LED string 102 input voltage Vstring or the value of the feedback voltage VFB expected at, for example, 10% of the inrush period. Additionally, the method described in the flowchart 130 of FIG. 8 may involve subsequent retesting for short-circuit conditions using a hiccup timer, as generally discussed below with reference to FIGS. 9 and 11.

Assuming no short circuits are detected during the inrush period, the backlight short-circuit protection circuitry 20 may continue to monitor whether a short-circuit condition occurs during the boost soft start phase, as generally represented by a flowchart 160 of FIG. 9. The flowchart 160 may begin when the backlight power and control circuitry 104 causes the backlight assembly 68 to enter the boost soft start phase (block 162). As mentioned above, the boost soft start phase may involve increasing the voltage of the LED string 102 input voltage Vstring via the boost block 116. Some amount of time after the boost soft start phase begins, such as 10% of the boost soft start period (decision block 164), the value of the feedback voltage VFB may be sensed (block 166). Although the decision block 164 of FIG. 9 indicates that the feedback voltage VFB is sensed after 10 percent of the boost soft start phase has begun, the feedback voltage VFB may be sensed any suitable amount of time after the boost soft start phase has begun. In general, since a short circuit is likely to become apparent relatively early in the boost soft start phase, it may be useful to sense the feedback voltage VFB earlier in the boost soft start phase rather than later.

As mentioned above, the feedback voltage VFB correlates directly with the LED string 102 input voltage Vstring. Thus, the backlight short-circuit protection circuitry 20 may estimate the LED string 102 input voltage Vstring from the feedback voltage VFB (block 168). For example, when the resistors R2 and R3 are equivalent, Vstring will be approximately equal to double the feedback voltage VFB. Alternatively, the backlight short-circuit protection circuitry 20 may not estimate the LED string 102 input voltage Vstring. The backlight short-circuit protection circuitry 20 may compare the LED string 102 input voltage Vstring to an expected voltage value Vexp (representing an expected value of Vstring) (block 170) or, alternatively, the feedback voltage VFB to an expected voltage Vexp (representing an expected value of VFB), to determine whether a short-circuit condition is present.

Specifically, during the boost soft start phase, the LED string 102 input voltage Vstring gradually increases as it is boosted to the voltage level sufficient to drive the LED string 102. The LED string 102 input voltage Vstring generally increases in a predictable manner. Thus, an expected voltage Vexp can be stored in the configuration memory 120. As mentioned above, the backlight short-circuit protection circuitry 20 may compare the estimated value of the string voltage Vstring to the expected voltage value Vexp (representing an expected value of Vstring) (block 170) or, alternatively, the feedback voltage VFB to an expected voltage Vexp (representing an expected value of VFB), to determine whether a short-circuit condition is present. If a difference between the expected voltage Vexp and the string voltage Vstring (or a difference between the expected voltage Vexp and the feedback voltage VFB) is less than some threshold value (decision block 172), a short-circuit condition has not been detected. As such, the backlight power and control circuitry 104 may prepare for a normal phase of operation (block 174). The threshold value may be a programmable value stored in the configuration memory 120 or may be, for example, hard-coded in the backlight short-circuit protection circuitry 20. The threshold referred to in FIG. 9 may be a different threshold than the threshold referred to in FIG. 8.

If the difference between the expected voltage Vexp and the LED string 102 input voltage Vstring (or the difference between the expected voltage Vexp and the feedback voltage VFB) does exceed the threshold (decision block 172), it may be understood that a short-circuit condition is occurring in the backlight assembly 68. Thus, the backlight short-circuit protection circuitry 20 may disconnect the power line FET PLF1 to cut power to the backlight assembly 68 (block 176). Additionally, the backlight short-circuit protection circuitry 20 may cause the configuration memory 120 to store an indication that a short-circuit condition was detected during the boost soft start phase of the operation of the backlight assembly 68.

In the example illustrated in FIG. 9, the backlight short-circuit protection circuitry 20 may seek to avoid false positive short-circuit conditions by entering a hiccup mode, if enabled in the configuration memory 120 (decision block 178). As mentioned briefly above, the hiccup mode may allow for retesting whether a short circuit has actually occurred. If the hiccup mode has not been enabled (decision block 178), the power line FET PLF1 may remain disconnected (block 180). Otherwise, the backlight power and control circuitry 104 may set a hiccup timer for a particular amount of time (block 182). The hiccup timer may last any suitable length of time, and may be a programmable setting in the configuration memory 120. For example, the hiccup timer may be a value between approximately 10 ms to 10,000 ms. In one example, the hiccup timer may last either 100 ms or 1000 ms depending on a setting in the configuration memory 120. When the hiccup timer ends, the backlight power and control circuitry 104 may restart the operation of the backlight assembly 68 starting from the inrush phase (block 184). If the short circuit is not determined to occur again, the previously determined short-circuit condition may be understood to have been a false positive.

As mentioned above, the LED string 102 input voltage Vstring may increase over the boost soft start phase. The feedback voltage VFB may increase accordingly. Thus, the value of the expected voltage Vexp used by the backlight short-circuit protection circuitry 20 to determine whether a short circuit has occurred may be set to take these changes into account. Depending on what point during the boost soft start phase the feedback voltage VFB is tested, the expected voltage Vexp may be higher or lower.

One example of how the expected voltage Vexp may vary with time appears in a plot 190 of FIG. 10. An ordinate 192 of the plot 190 represents the expected voltage Vexp value of either the LED string 102 input voltage Vstring or the feedback voltage VFB. An abscissa 194 represents time over the boost soft start phase. Between the start of the boost soft start phase 196 and the end of the boost soft start phase 198, a curve 200 representing the change in the expected voltage Vexp of the LED string 102 input voltage Vstring or the feedback voltage VFB gradually increases from a starting voltage Vstart to an ending voltage Vend. The precise manner in which the curve 200 changes over time may vary depending on the design of the backlight assembly 68 and may be determined experimentally or through modeling.

The value of the expected voltage Vexp compared to Vstring or VFB by the backlight short-circuit protection circuitry 20 may be stored in the configuration memory 120 as a fixed value or as a mathematical formula, or may be hard-coded into the backlight short-circuit protection circuitry 20. For example, when the feedback voltage VFB is to be sensed at approximately 10% of the boost soft start phase (e.g., at a time 202 shown in FIG. 10), the configuration memory 120 may store a corresponding expected voltage Vexp value (e.g., as illustrated at numeral 204). Alternatively, the configuration memory 120 may store a mathematical function representing the increase in the expected voltage Vexp over time through the boost soft start phase (e.g., the curve 200). Under such conditions, the backlight short-circuit protection circuitry 20 may determine the value of Vexp to be tested based on the mathematical function and the time through the boost soft start phase in which the feedback voltage VFB is sensed. In some embodiments, the value of the expected voltage Vexp may be determined at least partly by the sensed value of the input voltage VIN. That is, since the starting voltage Vstart and the ending voltage Vend may depend on the input voltage VIN, the backlight short-circuit protection circuitry 20 may determine Vexp as a function of VIN. Thus, in some embodiments, the value of Vexp may be stored in the configuration memory 120 as a function of VIN.

Following the boost soft start phase, the backlight short-circuit protection circuitry 20 may continue to detect and protect against short circuits through the normal operation phase, as shown by a flowchart 210 of FIG. 11. The flowchart 210 of FIG. 11 may begin after the boost soft start phase has ended and the LED string 102 input voltage Vstring has reached the level sufficient to drive the LED string 102. The boost block 116 may maintain this boosted voltage level of the LED string input voltage Vstring through the normal operation phase. Indeed, as long as short circuits are not occurring, Vstring should remain relatively constant. Thus, the backlight short-circuit protection circuitry 20 may test the feedback voltage VFB to ensure that the LED string 102 input voltage Vstring has not dropped dramatically, which could indicate a short-circuit condition (block 214). For example, the backlight short-circuit protection circuitry 20 may test whether a short circuit is occurring every 1 ms, 10 ms, 100 ms, 1000 ms, 10,000 ms, or even longer, depending on a confidence in the backlight assembly 68.

When the backlight short-circuit protection circuitry 20 tests for short-circuit conditions, the value of the feedback voltage VFB may be sensed (block 216). As mentioned above, the feedback voltage VFB correlates directly with the LED string 102 input voltage Vstring. Thus, the backlight short-circuit protection circuitry 20 may estimate the LED string 102 input voltage Vstring from the feedback voltage VFB (block 218). For example, when the resistors R2 and R3 are equivalent, Vstring will be approximately equal to double the feedback voltage VFB. Alternatively, the backlight short-circuit protection circuitry 20 may not estimate the LED string 102 input voltage Vstring. The backlight short-circuit protection circuitry 20 may compare the LED string 102 input voltage Vstring to an expected voltage value Vexp (representing an expected value of Vstring) (block 220) or, alternatively, the feedback voltage VFB to an expected voltage Vexp (representing an expected value of VFB), to determine whether a short-circuit condition is present. It should be noted that the particular expected voltage Vexp discussed with reference to FIG. 11 will likely be different (higher) than the particular expected voltage Vexp discussed with reference to FIG. 9.

Specifically, after the boost soft start phase, the LED string 102 input voltage Vstring will remain substantially constant at a boosted level absent a short circuit. Thus, this expected voltage Vexp can be stored in the configuration memory 120. As mentioned above, the backlight short-circuit protection circuitry 20 may compare the estimated value of the string voltage Vstring to the expected voltage value Vexp (representing an expected value of Vstring) (block 220) or, alternatively, the feedback voltage VFB to an expected voltage Vexp (representing an expected value of VFB), to determine whether a short-circuit condition is present. If a difference between the expected voltage Vexp and the string voltage Vstring (or a difference between the expected voltage Vexp and the feedback voltage VFB) is less than some threshold value (decision block 222), a short-circuit condition has not been detected. As such, the backlight power and control circuitry 104 may continue with the normal phase of operation (block 212). It should be noted that threshold value may be a programmable value stored in the configuration memory 120 or may be, for example, hard-coded in the backlight short-circuit protection circuitry 20. The threshold referred to in FIG. 11 may be a different threshold than the thresholds referred to in FIGS. 8 and 9.

If the difference between the expected voltage Vexp and the LED string 102 input voltage Vstring (or the difference between the expected voltage Vexp and the feedback voltage VFB) does exceed the threshold (decision block 222), it may be understood that a short-circuit condition is occurring in the backlight assembly 68. Thus, the backlight short-circuit protection circuitry 20 may disconnect the power line FET PLF1 to cut power to the backlight assembly 68 (block 224). Additionally, the backlight short-circuit protection circuitry 20 may cause the configuration memory 120 to store an indication that a short-circuit condition was detected during the normal operation phase of the operation of the backlight assembly 68.

In the example illustrated in FIG. 11, the backlight short-circuit protection circuitry 20 may seek to avoid false positive short-circuit conditions by entering a hiccup mode, if enabled in the configuration memory 120 (decision block 226). As mentioned briefly above, the hiccup mode may allow for retesting whether a short circuit has actually occurred. If the hiccup mode has not been enabled (decision block 226), the power line FET PLF1 may remain disconnected (block 228). Otherwise, the backlight power and control circuitry 104 may set a hiccup timer for a particular amount of time (block 230). The hiccup timer may last any suitable length of time, and may be a programmable setting in the configuration memory 120. For example, the hiccup timer may be a value between approximately 10 ms to 10,000 ms. In one example, the hiccup timer may last either 100 ms or 1000 ms depending on a setting in the configuration memory 120. When the hiccup timer ends, the backlight power and control circuitry 104 may restart the operation of the backlight assembly 68 starting from the inrush phase (block 232). If the short circuit is not determined to occur again, the previously determined short-circuit condition may be understood to have been a false positive.

Technical effects of the present disclosure include, among other things, the efficient detection of short circuits in a backlight assembly without the use of a resistor-based current sensor. Since a resistor-based current sensor may constantly dissipate power in the form of waste heat, detecting short circuits according to the present disclosure may result in a very substantial savings in power.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic display comprising:
a display panel; and
a backlight assembly configured to illuminate the display panel at least partly by driving a backlight element, the backlight assembly comprising backlight short-circuit detection circuitry configured to detect a recent or current value of a feedback voltage associated with the backlight element and determine when a short circuit has occurred based at least in part on a comparison between the recent or current value of the feedback voltage and an expected value of the feedback voltage, wherein the expected value of the feedback voltage changes over time and the backlight assembly comprises configuration memory, wherein the backlight short-circuit detection circuitry is configured to determine the expected value of the feedback voltage based at least in part on a curve stored in the configuration memory, wherein the curve represents the expected value of the feedback voltage over time.

2. The electronic display of claim 1, wherein the feedback voltage comprises a voltage applied to the backlight element or a voltage-divided value of the voltage applied to the backlight element.

3. The electronic display of claim 1, wherein the backlight short-circuit detection circuitry is configured to determine when the short circuit has occurred based at least in part on a comparison between the recent or current value of the feedback voltage and a value of a backlight assembly input voltage.

4. Backlight driver circuitry configured to drive a backlight element, the backlight driver circuitry comprising:
a power line FET configured to permit input power at a first input voltage to be received when the power line FET is activated;
boost converter circuitry configured to boost the first input voltage to a second input voltage at the backlight element;
an active current sink configured to draw current through the backlight element to drive the backlight element; and
control circuitry configured to control the power line FET, the boost converter circuitry, and the current sink to drive the backlight element, and detect whether a short circuit has occurred during a boost phase of operation based at least in part on a comparison between the second input voltage and an expected value of the second input voltage without using any resistor-based current measurement, wherein the expected value during the boost phase of operation is dynamic.

5. The backlight driver circuitry of claim 4, comprising first voltage sense circuitry configured to sense the first input voltage and second voltage sense circuitry configured to sense the second input voltage or a proportion of the second input voltage, wherein the control circuitry is configured to detect whether the short circuit has occurred during an inrush phase of operation based at least in part on a comparison between the first input voltage and the second input voltage or the proportion of the second input voltage.

6. The backlight driver circuitry of claim 4, comprising voltage sense circuitry configured to sense the second input voltage or a proportion of the second input voltage, wherein the control circuitry is configured to detect whether the short circuit has occurred during a normal phase of operation based at least in part on a comparison between the second input voltage or the proportion of the second input voltage and an expected value of the second input voltage or the proportion of the second input voltage.

7. The backlight driver circuitry of claim 4, wherein the control circuitry comprises a hardware state machine or a microcontroller, or a combination thereof, configured to detect whether the short circuit has occurred.

8. The backlight driver circuitry of claim 4, comprising a memory, wherein the control circuitry is configured to set a flag in the memory when a short circuit is detected to have occurred.

9. The backlight driver circuitry of claim 4, wherein the control circuitry is configured to deactivate the power line FET when the control circuitry detects that a short circuit has occurred.

10. An electronic device comprising:
a processor configured to generate image data; and
an electronic display configured to display the image data, wherein the electronic display comprises a backlight assembly, the backlight assembly being configured to illuminate the electronic display by driving a backlight element and detect when a short circuit occurs in the backlight assembly during an inrush period, a boost soft start period, and a normal operation period occurring after the inrush period and the boost soft start period, wherein the backlight assembly is configured to detect when the short circuit occurs in the backlight assembly:
during the inrush period, based at least in part on a comparison of a feedback voltage value associated with the backlight element and a value of a backlight assembly input voltage; and
during the boost soft start period and the normal operation period, based at least in part on a comparison of the feedback voltage value and an expected value of the feedback voltage value, wherein the expected value of the feedback voltage value is dynamic during the boost soft start period;
wherein the backlight assembly of the electronic display is configured to permanently cut off power to the backlight element when a short circuit is detected in the backlight assembly to protect the processor or other components of the electronic device.

11. The electronic device of claim 10, wherein the backlight assembly is configured to determine the expected value of the feedback voltage value based at least in part on the value of the backlight assembly input voltage.

12. A method comprising:
sensing a backlight assembly input voltage during an inrush period of operation using backlight control circuitry;
sensing a feedback voltage associated with a voltage provided to a light-emitting element of the backlight assembly during operation using the backlight control circuitry;
determining in the backlight control circuitry whether a short circuit has occurred in the backlight assembly during the inrush period of operation before boosting the input voltage based at least in part on a comparison between the input voltage and the feedback voltage;
determining in the backlight control circuitry whether a short circuit has occurred in the back light assembly during a boost phase of operation based at least in part on a comparison between the feedback voltage and an expected value of the feedback voltage, wherein the expected value of the feedback voltage is non-static; and when a short circuit has occurred, issuing a control signal from the backlight control circuitry to cut power to the backlight assembly.

13. The method of claim 12, wherein whether a short circuit has occurred during the inrush period is determined based at least in part on whether the feedback voltage has reached a threshold proportion of the input voltage.

14. The method of claim 12, comprising extrapolating the voltage provided to the light-emitting element of the backlight based at least in part on the feedback voltage using the backlight control circuitry, wherein whether the short circuit has occurred during the inrush period is determined based at least in part on whether the extrapolated value of the voltage provided to the light-emitting element of the backlight has reached a threshold proportion of the input voltage.

15. An article of manufacture comprising:
non-transitory, tangible, machine-readable media configured to store processor-executable instructions, the instructions comprising:
instructions to determine to test whether a short circuit has occurred in a backlight assembly of an electronic display;
instructions to receive a sensed feedback voltage value associated with a backlight element of the backlight assembly;
instructions to receive an expected value of the feedback voltage from memory; and
instructions to determine that the short circuit has occurred when the sensed feedback voltage value and the expected value of the feedback voltage differ by more than a threshold amount, wherein the expected value of the feedback voltage is non-static during a boost soft start period.

16. The article of manufacture of claim 15, wherein the instructions to determine to test whether the short circuit has occurred comprise instructions to set a timer when the backlight assembly enters a boost soft start phase and to determine to test whether the short circuit has occurred when the timer indicates a specified amount of time has passed.

17. The article of manufacture of claim 16, wherein the specified amount of time comprises less than half of the time of the boost soft start phase.

18. The article of manufacture of claim 15, wherein the instructions to determine to test whether the short circuit has occurred comprise instructions to occasionally determine to test whether the short circuit has occurred while the backlight assembly is operating in a normal operation phase after an inrush phase and a boost soft start phase.

19. The article of manufacture of claim 15, wherein the instructions to determine to test whether the short circuit has occurred comprise instructions to determine to test whether the short circuit has occurred during an inrush phase and a boost soft start phase such that field effect transistors of the backlight assembly will not be operating outside of a safe operating area (SOA).

20. The article of manufacture of claim 15, wherein the instructions to determine to test whether the short circuit has occurred comprise instructions to determine to test whether the short circuit has occurred within approximately 10% of an inrush phase or within approximately 10% of a boost soft start phase, or both.

21. The article of manufacture of claim 15, wherein the instructions to determine that the short circuit has occurred comprise instructions to determine that the short circuit has occurred when the sensed feedback voltage value amounts to less than approximately 75% of the expected value of the feedback voltage.

22. The article of manufacture of claim 15, comprising instructions to set a flag in the memory to indicate that the short circuit has occurred when the short circuit is determined to have occurred.

23. The article of manufacture of claim 15, comprising instructions to set a hiccup timer and to retest whether the short circuit has occurred when the hiccup timer elapses.

24. The article of manufacture of claim 23, wherein the hiccup timer lasts between approximately 10 ms and 10,000 ms.

* * * * *